United States Patent Office 3,193,852
Patented July 13, 1965

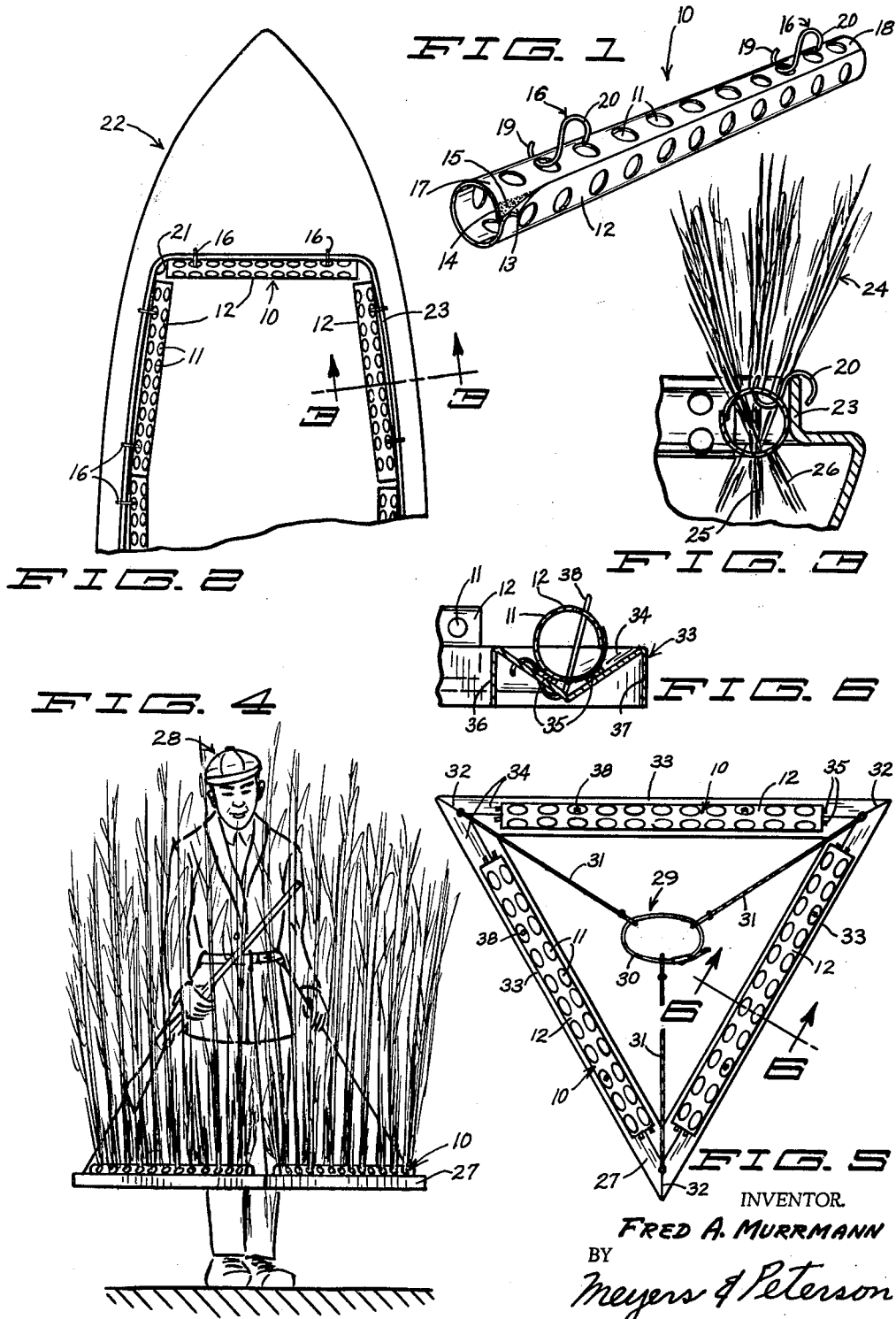

3,193,852
BLIND HOLDER
Fred A. Murrmann, 4537 43rd Ave., Minneapolis, Minn.
Filed July 19, 1962, Ser. No. 210,897
8 Claims. (Cl. 9—5)

This invention relates to blinds and more particularly to a blind holder adapted for having secured thereto natural vegetation in a manner which enhances the camouflaging effect thereof.

An object of this invention is to provide an improved blind holder which has provision for temporarily securing thereto a minimal natural appearing arrangement of camouflage foliage for maximum concealment of persons or devices.

Another object is to provide a blind holder which is highly durable and economical to manufacture, yet which is simple in design.

A further object is to provide a blind holder as set forth above which is easily handled during use because of its compact size and light weight.

A still further object is to provide a blind holder of the type set forth above which may be combined with separate and independent sections and that may be easily installed upon a mobile means and then just as easily removed in whole or in part from its installation.

Still another object is to provide a means that is adapted to be carried by an individual which in turn will support several blind holders with camouflaging vegetation whereby to conceal the individual while he is walking along the ground.

These and other objects and advantages of my invention will more fully appear from the following description, made in connection with the accompanying drawing, wherein like reference characters refer to the same or similar parts throughout the several views and in which:

FIGURE 1 is a perspective view of a blind holder segment,

FIGURE 2 is a partial top view of a boat showing the manner of securing blind holder segments thereto, FIGURE 3 is an enlarged cross sectional end view of the boat gunwale taken on line 3—3 of FIGURE 2 showing the manner of securing the blind holder segments thereto and further showing stalks of natural vegetation camouflage as they would appear inserted into a blind holder, FIGURE 4 is a front elevation view of a mobile frame which is secured to a hunter together with a supply of camouflaging vegetation held by a plurality of blind holder segments, FIGURE 5 is an enlarged top view of the mobile frame shown in FIGURE 4, and FIGURE 6 is an enlarged cross sectional end view of FIGURE 5 taken on line 6—6 and shows the means of securing the blind holder segments to the frame.

Referring particularly now to FIGURE 1, a blind holder or blind holder segment 10 is shown which constitutes the supporting means for the natural vegetation which is to be used for the camouflage. The blind holder is made from a sheet of stiff but bendable material such as vinyl plastic which is resistive to moisture caused decay and which also is highly durable and resistive to wear and deformation caused by rough usage. The sheet is provided with a plurality of apertures 11 prior to its being formed into an elongate hollow tube 12 as shown. The edges 13 and 14 of the tube are sealed together with an adhesive material 15. They may however be heat sealed. The apertures 11, preferably of about one inch in diameter, are positioned in rows, as shown, in FIGURE 1 and are finally positioned in spaced relation to each other once the tube 12 is formed.

A pair of wire hook elements 16 are also provided. Each hook is placed at one end 17 or 18 of the tube for two purposes. The first is to support and secure the tube to a boat gunwale as shown in FIGURE 3 or a frame as shown in FIGURE 6, and the second is to prevent torsional rotation of the tube under weight of vegetation secured thereto as will be set forth shortly. To this end, the support end 19 of each hook is bent so as to pass through two adjacent apertures as shown in FIGURE 1. The free end 20 of each hook is bent so as to grasp the device to which the tube 12 is being secured.

One manner in which the blind holders may be used is shown in FIGURE 2 wherein they are placed end for end around the perimeter 21 of the inside of the boat 22. Referring to FIGURE 3, the weight of the elongate hollow tube 12 causes it to rest against the inside perimeter when the free end 20 is hooked over the gunwale 23. In addition, the weight of the stalks 24 of natural vegetation such as willows, reeds, rushes, and the like, causes the tube 12 to be more firmly secured in position.

In regard to FIGURE 3, one of the novel advantages of this invention is clearly shown. Whereas prior art blinds are generally fabricated in a manner such that the camouflaging vegetation is confined to a single vertical plane, the device the applicant provides allows the stalks to be placed at any one of a number of angles. This is possible because of the spaced relation of the apertures 11 around the tube 12. Thus, a stalk may be placed through two vertically oriented apertures, as are the stalks 25, or they may be placed through two angularly oriented apertures as are stalks 26. In this manner, a more natural appearing blind is provided because of the general diffused appearance.

Another advantage of the present invention is the versatility of the means for securing the tubes 12 to the boat. If a hunter, when located within the boat, wishes to move the boat to a different location, only one or two of the blind holders with its camouflage material needs to be removed whereafter a paddle may be operated from within the boat and between adjacent tubes 12. Furthermore, if the hunter wishes to cross a body of open water where there is a substantial wind and appreciable resistance to the camouuage materials, it is a simple matter to merely unhook each tube 12, with its camouflage material, and lay them in one end of the boat. When it is desired to again hunt, the hunter merely secures the tubes to the boat gunwales, etc. as originally done so as to acquire his camouflage.

Since each of the stalks of vegetation is only temporarily secured in the tube 12, another advantage inherent in this device is the freedom of replacing unnatural appearing stalks or adding new and additional stalks to the blind to enhance the deceptive appearance as a whole.

The versatility of the present invention is further exemplified when considering FIGURE 4 wherein the blind holders are temporarily secured to a delta frame 27 that is in turn secured to a hunter 28. In this manner, the hunter may move about in shallow water or on dry land and always have his camouflage with him. The delta frame may, of course, be of other configuration than a triangle, however, the triangular arrangement provides adequate room for the hunter to operate his fire arm while the camouflaging means is at a minimal size.

The delta frame, as seen in FIGURE 5 has a harness support means 29 which constitutes a belt 30 and tie ropes 31 that are secured respectively at each corner or joinder point 32 of leg members 33. Referring to FIGURE 6, each leg member 33 has a longitudinally disposed V-shaped trough 34. A pair of riser slats 35 are positioned in the trough on which the elongate tubes 12 are seated. Thus, the tube is supported in spaced relation from the trough 34 so that the vegetation stalks will be allowed to project through two apertures 11 and then seat in abutting relation against the V-trough. Each trough in turn has a pair of integrally formed vertical sides 36 and 37 for structural support. The troughs 34 and riser slats 35 may also be of vinyl plastic for reasons as set forth above in regard to the elongate tubes 12, or they may be made of wood, light aluminum, and the like.

The V-shaped trough 34 is designed as such to prevent the tubes 12 from rotating due to uneven filling with vegetation stalks. To further aid in this prevention, a wire hook 38 may again be used, this time however, being more permanently secured to the trough 33, as shown, while the tube 12 is more temporarily secured merely by its own weight. In this manner the elongate tubes with their camouflage may be more easily removed from the delta frame either at the time the hunter ends his day of hunting, or whenever the hunter has spotted his game and desires a clearer and unobstructed view for shooting.

It is also pointed out that one of several other versatile installations of the blind may be realized by sticking the wire hooks straight into the ground with enough length exposed above the ground surface to completely pass through oppositely disposed apertures 11 in a manner similar to that shown in FIGURE 6. Thus, when the tubes 12, together with the camouflaging materials, are seated upon the wires, so stuck into the ground, a temporary but stationary blind will be available on dry land.

It is thus seen that a highly desirable improvement has been made in the blind holder art which shows simplicity, versatility, and economy, as well as a more authentic means of camouflaging a hunter regardless of his mode of transportation.

It will, of course, be understood that various changes may be made in the form, details, arrangements and proportions of the parts without departing from the scope of my invention as set forth in the appended claims. For example, several blind holder segments of differing diameters could be fitted within each other in a telescoping manner. With the much more compact size, the holder segments would be ideal for armed service combat soldiers to carry in their packs. When combat conditions existed, the blind holder could be unpacked and quickly set up for camouflage purposes. The length of the blind holder may be varied according to the individual requirements as may the number of apertures contained therearound. The size of apertures is, however, generally determined by the type and quantity of vegetation to be utilized as a camouflage.

What is claimed:
1. A blind holder comprising,
  (a) an elongate and hollow tube having a plurality of apertures closely spaced around the circumference thereof and also spaced longitudinally therealong,
  (b) said apertures being adapted to receive therethrough the stalks of natural vegetation such as reeds and the like, with individual random pairs of said apertures being adapted to make contact with an individual stalk at spaced points along the length of said stalk, and retain individual stalks at arcuately and longitudinally spaced positions,
  (c) said tube further being formed from a relatively stiff but bendable material, and
  (d) means for securing said hollow tube in a non-rotatable position, whereby natural vegetation stalks may be inserted through a pair of said apertures and held at an upward angle without said tube rotating.
2. A blind holder as set forth in claim 1 wherein said relatively stiff but bendable material comprises a lightweight and non-corrosive synthetic material.
3. A blind holder comprising,
  (a) an elongate straight hollow tube having a plurality of adjacent apertures in arcuately spaced relation around the curcumference and also longitudinally thereof,
  (b) said apertures being adapted to receive therethrough the stalks of natural vegetation such as reeds and the like, with individual random pairs of said apertures being adapted to make contact with an individual stalk at spaced points along the length of said stalk, and retain individual stalks at arcuately and longitudinally spaced positions,
  (c) said tube further being formed from a relatively stiff but bendable sheet material, and
  (d) means for securing said hollow tube in a non-rotatable position with the axis thereof substantially horizontal.
4. In combination,
  (a) a water craft having upwardly projecting side walls,
  (b) a plurality of tubular blind holder segments positioned in a substantially horizontal position adjacent said upwardly projecting side walls, and
  (c) means for temporarily securing said blind holder segments to said side walls whereby said segments will be prevented from rotating,
  (d) said blind holder segments each having a plurality of adjacent apertures in a longitudinally spaced and arcuately spaced relation around the circumference thereof adapted to receive therethrough and temporarily hold stalks of natural vegetation such as reeds and the like, with individual random pairs of said apertures being adapted to make contact with an individual stalk at spaced points along the length of said stalk, and retain individual stalks at arcuately and longitudinally spaced positions.
5. A plurality of blind holder segments of different diameters, the diameters thereof permitting the segments to be telescoped together, each said blind holder segment comprising,
  (a) an elongate and hollow tube having a plurality of adjacent apertures longitudinally spaced around the circumference thereof,
  (b) said apertures being arcuately spaced and adapted to receive therethrough the stalks of natural vegetation such as reeds and the like, with individual random pairs of said apertures being adapted to make contact with an individual stalk at spaced points along the length of said stalk, and retain individual stalks at arcuately and longitudinally spaced positions,
  (c) said tube further being formed from a relatively stiff but bendable material, and
  (d) means for securing said hollow tube in a non-rotatable position, whereby natural vegetation may be inserted through a pair of said apertures and held at an upward angle without said tube rotating.
6. A portable blind holder comprising,
  (a) an elongate and hollow tube having a plurality of arcuately spaced apertures at spaced longitudinal and circumferential locations, with individual random pairs of said apertures being adapted to make contact with an individual stalk at spaced points along the length of said stalk, and retain individual stalks at arcuately and longitudinally spaced positions, and
  (b) means for engaging certain of said apertures for retaining said tube in juxtaposition with a support.
7. A portable blind holder in accordance with claim 6 in which said means includes,
  (a) a plurality of hook elements,
  (b) one portion of each hook element being engageable in a pair of said apertures and a second portion of each hook element being engageable with said support.
8. A portable blind holder in accordance with claim 7 in which:
  (a) said support is the side of a boat,
  (b) said second portion of each hook element being adapted to extend over the upper edge of said boat side.

(References on following page)

References Cited by the Examiner

UNITED STATES PATENTS

| | | | |
|---|---|---|---|
| 1,611,589 | 12/26 | Janusek | 41—12 |
| 2,327,168 | 8/43 | Bucknell | 9—5 |
| 2,577,983 | 12/51 | Van Vessem | 9—5 |
| 2,744,348 | 5/56 | Smith | 161—27 |
| 2,816,297 | 12/57 | Stanley | 9—5 |
| 3,011,280 | 12/61 | Keidd | 41—12 |

FERGUS S. MIDDLETON, *Primary Examiner.*

ABRAHAM G. STONE, *Examiner.*